(12) United States Patent
Jun et al.

(10) Patent No.: US 8,446,055 B2
(45) Date of Patent: May 21, 2013

(54) LINEAR TYPE VIBRATION MOTOR HAVING MAGNET CASING

(75) Inventors: Jae-Woo Jun, Suwon-si (KR); Jun-Kun Choi, Suwon-si (KR); Hwa-Young Oh, Seoul (KR); Jee-Sung Lee, Suwon-si (KR); Yong-Jin Kim, Suwon-si (KR); Kyung-Ho Lee, Suwon-si (KR); Seok-Jun Park, Suwon-si (KR); Kwang-Hyung Lee, Suwon-si (KR); Je-Hyun Bang, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 352 days.

(21) Appl. No.: 12/815,826

(22) Filed: Jun. 15, 2010

(65) Prior Publication Data

US 2011/0012442 A1 Jan. 20, 2011

(30) Foreign Application Priority Data

Jul. 20, 2009 (KR) .......................... 10-2009-0065921

(51) Int. Cl.
*H02K 33/16* (2006.01)
*H02K 33/00* (2006.01)

(52) U.S. Cl.
USPC ............... 310/17; 310/12.24; 310/23; 310/36

(58) Field of Classification Search
USPC .......................... 310/12.24–12.26, 15, 20–24
See application file for complete search history.

(56) References Cited

U.S. PATENT DOCUMENTS

| | | | | |
|---|---|---|---|---|
| 3,149,255 A * | 9/1964 | Trench | ............................. | 310/30 |
| 4,850,100 A * | 7/1989 | Stokes | ............................. | 29/596 |
| 6,326,706 B1 * | 12/2001 | Zhang | ......................... | 310/12.31 |
| 7,417,343 B2 * | 8/2008 | Lindberg et al. | ................. | 310/90 |
| 7,474,018 B2 * | 1/2009 | Shimizu et al. | ............. | 310/12.22 |
| 8,013,480 B2 * | 9/2011 | Bang et al. | .................. | 310/12.25 |
| 2008/0001578 A1 * | 1/2008 | Cap | ..................................... | 322/3 |
| 2008/0084121 A1 * | 4/2008 | Kelly | .............................. | 310/12 |

FOREIGN PATENT DOCUMENTS

| JP | 08-116658 | 5/1996 |
|---|---|---|
| KR | 10-2007-0103174 | 10/2007 |

OTHER PUBLICATIONS

Korean Office Action, with partial English translation, issued in Korean Patent Application No. 10-2009-0065921, mailed Jan. 6, 2011.

Chinese Office Action with English translation issued in application No. 201010205827.8 issued on May 3, 2012.

* cited by examiner

*Primary Examiner* — Burton Mullins
(74) *Attorney, Agent, or Firm* — McDermott Will & Emery LLP

(57) ABSTRACT

A linear type vibration motor having a magnet casing is disclosed. The linear type vibration motor in accordance with an embodiment of the present invention includes a magnet assembly having a pair of magnets, in which same magnetic poles thereof face each other, a magnet casing, which has a hollow part formed therein and houses the magnet assembly in the hollow part, a base, which has a bobbin formed thereon and in which the magnet casing is inserted into the bobbin, a coil, which is coupled to the bobbin, a weight, which is coupled to both ends of the magnet casing, and a pair of elastic bodies, which are interposed between either end of the base and either end of the weight, respectively. Thus, the operating lifetime of the linear type vibration motor can be extended, and this arrangement can prevent the linear type vibration motor from being damaged by an external shock.

2 Claims, 6 Drawing Sheets

LINEAR TYPE VIBRATION MOTOR HAVING MAGNET CASING

CROSS-REFERENCE TO RELATED APPLICATIONS

This application claims the benefit of Korean Patent Application No. 10-2009-0065921, filed with the Korean Intellectual Property Office on Jul. 20, 2009, the disclosure of which is incorporated herein by reference in its entirety.

BACKGROUND

1. Technical Field

The present invention is related to a linear type vibration motor having a magnet casing.

2. Description of the Related Art

A vibration motor is a part that converts electrical energy into mechanical vibrations by using the principle of generating electromagnetic forces, and is commonly installed in a mobile phone to generate a soundless vibrating alert. With the rapid expansion of mobile phone markets and increased functionalities added to the mobile phone, mobile phone parts are increasingly required to be smaller and better. As a result, there has been an increased demand for the development of a new structure of vibration motor that can overcome the shortcoming of conventional vibration motors and effectively improve the quality.

As mobile phones having a bigger LCD screen have become popular for the past few years, there have been an increasing number of mobile phones adopting a touch-screen method, by which the body or screen of a mobile phone is vibrated when a user touches an input unit of the mobile phone in order to provide the user an appealing sensory feel when touching the touch screen. Commonly used to generate the vibration is a vibration motor.

The touch-screen method particularly requires that the vibration motor has a greater durability due the a greater frequency of generating vibrations in response to the touch compared to the vibration bell for incoming calls and that the vibration motor has a faster response to the touch made on the touch screen, in order to provide the user a greater satisfaction from sensing the vibration when touching the touch screen.

The conventional vibration motors commonly used in mobile phones generate a rotational force to cause mechanical vibrations by rotating an eccentric rotor. The rotational force is generated by supplying an electric current to the coil of a rotor by using the rectifying action of a brush and a commutator.

The vibration motor using such brush and commutator has a shorter operating lifetime due to mechanical friction and electrical sparks, which cause wear and black powder, while the brush moves between the segments of the commutator when the motor rotates. Moreover, when voltage is supplied to the vibration motor, it takes time to reach the target amount of vibration, i.e., the magnitude by which it is sufficient for the user to sense the vibration, by the rotational inertia of the vibration motor, causing a slower response to the touch made on the touch screen.

Developed to overcome the drawbacks of shorter operating lifetime and slower responsiveness is a linear type vibration motor. The linear type vibration motor does not use the principle of rotation of a motor but uses an electromagnetic force having a predetermined resonant frequency to generate vibrations by use of an elastic body installed in the vibration motor and the mass of a weight elastically supported by the elastic body.

Here, the electromagnetic force is generated by a direct or alternating current supplied to a coil. More specifically, a direct or alternating current having a frequency considering the modulus of elasticity of the elastic body and the mass of the weight is applied to a coil to allow the linear type vibration motor to generate vibrations that correspond to the resonant frequency.

Used to form the magnetic body, which is vibrated by the electromagnetic force generated by the coil, is a magnet assembly, in which a pair of magnets are disposed in such a way that same magnetic poles face each other in order to increase the density of magnetic flux penetrating through the coil in a perpendicular direction to the coil. This will be described with reference to FIG. 1.

Illustrated in FIG. 1 is a conventional magnet assembly.

Referring to FIG. 1, a magnet assembly 140 is constituted by a core 142, a first magnet 143 and a second magnet 144. The first magnet 143 and the second magnet 144 are coupled to either side of the core 142 by use of an adhesive. While the core 142 is interposed between the first magnet 143 and the second magnet 144, the polarity of the first magnet 143 faces the same polarity of the second magnet 144. In other words, the first magnet 143 and the second magnet 144 are disposed in such a way that same magnetic poles face each other.

Here, as illustrated in FIG. 1, the first magnet 143 and the second magnet 144 are disposed in such a way that the N-poles are placed on either end of the magnet assembly 140, respectively. Although it is not illustrated in FIG. 1, they can be disposed in such a way that the S-poles are placed on either end of the magnet assembly 140.

The magnet assembly 140 vibrates frequently, and if a mobile phone having a linear type vibration motor embedded therein is dropped from a high position due to, for example, the user's carelessness, a strong shock is applied to the magnet assembly 140. In this case, since the first magnet 143 and the second magnet 144 are coupled to the core 142 by an adhesive, as described above, they may be separated from one another by the vibration or shock. This may cause malfunction of the linear type vibration motor.

SUMMARY

The present invention provides a linear type vibration motor having a magnet casing that is less vulnerable to vibrations and shocks and has a long operating lifetime.

An aspect of the present invention provides a linear type vibration motor having a magnet casing that includes a magnet assembly having a pair of magnets, in which same magnetic poles thereof face each other, a magnet casing, which has a hollow part formed therein and houses the magnet assembly in the hollow part, a base, which has a bobbin formed thereon and in which the magnet casing is inserted into the bobbin, a coil, which is coupled to the bobbin, a weight, which is coupled to both ends of the magnet casing, and a pair of elastic bodies, which are interposed between either end of the base and either end of the weight, respectively.

An adhesive can be coated on an outer surface of the magnet assembly or an inner surface of the hollow part.

At least one fixing protrusion can be formed on both ends of the magnet casing, and the fixing protrusion can fix the magnet assembly by being bent toward a central axis of the magnet casing such that the magnet assembly is prevented from being detached.

Additional aspects and advantages of the present invention will be set forth in part in the description which follows, and in part will be obvious from the description, or may be learned by practice of the invention.

DETAILED DESCRIPTION

Figure 1:
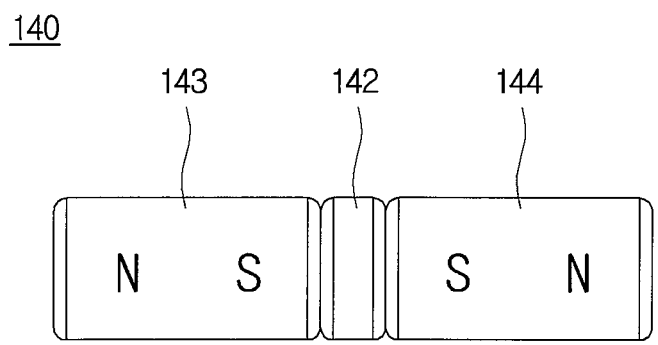
FIG. 1 is a side view of a conventional magnet assembly.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed descriptions of related art are omitted when it is deemed that they may unnecessarily obscure the essence of the invention.

The features and advantages of this invention will become apparent through the below drawings and description.

Figure 2:
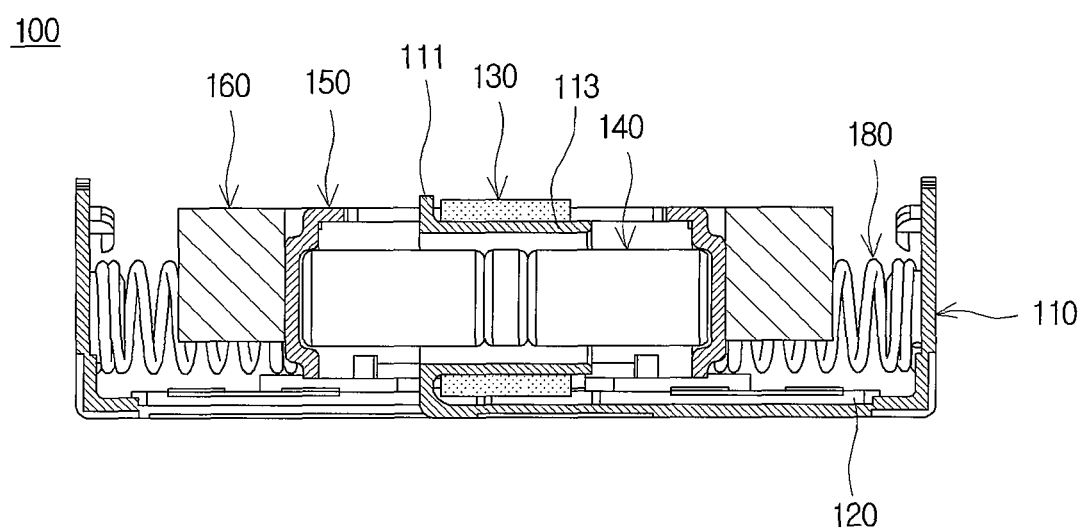
FIG. 2 is a cross-sectional view of a linear type vibration motor.

FIG. 2 is a cross-sectional view of a linear type vibration motor.

Referring to FIG. 2, a linear type vibration motor 100 includes a base 110, a substrate 120, a coil 130, a magnet assembly 140, a yoke 150, a weight 160 and an elastic body 180.

A bracket 111 is formed on the base 110, and a bobbin 113 having a hollow part formed therein is formed on the bracket 111. The substrate 120 is mounted inside the base 110, and both sides of the base 110 are extended vertically and upwardly.

The coil 130 is coupled to the bobbin 113 and has a cylindrical shape having a hollow part formed therein. By inserting the bobbin 113 into the hollow part of the coil 130, the coil 130 can be coupled to the bobbin 113. The magnet assembly 140 is inserted into the center portion of the bobbin 113. Here, the magnet assembly 140 can move in a lengthwise direction in the hollow part of the bobbin 113.

Although it is not illustrated, the substrate 120 is positioned in such a way that an electric current can be supplied to the coil 130.

The yoke 150 is coupled to both ends of the magnet assembly 140. Thus, the yoke 150 can move with the magnet assembly 140 when the magnet assembly 140 moves relatively with respect to the coil 130.

Since the yoke 150 forms a magnetic circuit with respect to the magnet assembly 140, the density of magnetic flux of the magnet assembly 140 that penetrates in a direction perpendicular to the coil 130 can be increased. This allows the electromagnetic force acting between the coil 130 and the magnet assembly 140 to be maximized.

The weight 160 is coupled to the yoke 150. As a result, the weight 160 can move with the yoke 150 when the yoke 150 is moved by the magnet assembly 140. The weight 160 functions to amplify vibrations when the magnet assembly 140 is reciprocated in a lengthwise direction by the coil 130. In other words, with a heavier mass of the weight 160, the vibration of the linear type vibration motor 100 becomes greater, and thus a substance that is as heavy as possible is used for the weight 160.

A pair of elastic bodies 180 are interposed between one of the upwardly extended parts, which are formed on either side of the base 120, and either side of the weight 160, respectively. Here, the direction where the elastic bodies 180 are disposed is the lengthwise direction of the magnet assembly 140. Therefore, if the weight 160 moves toward one side, one of the elastic bodies 180 is compressed, and the other one is elongated.

If the linear type vibration motor 100 is allowed to vibrate at a resonant frequency by using the modulus of elasticity of the elastic body 180 and the mass of the weight 160, a maximum vibration can be obtained. That is, if a pulsating current or alternating current having a particular frequency is applied to the coil 130, the linear type vibration motor 100 can vibrate at the resonant frequency.

The linear type vibration motor 100 usually undergoes continuous vibrations, and if a mobile phone having the linear type vibration motor 100 embedded therein is dropped from a high position due to the user's carelessness while the mobile phone is in use, a shock can be also applied to the magnet assembly 140. If the shock is transferred to the magnet assembly 140, the first magnet 143 and the second magnet 144 can be separated from the core 142, causing malfunction of the linear type vibration motor 100.

Figure 3:
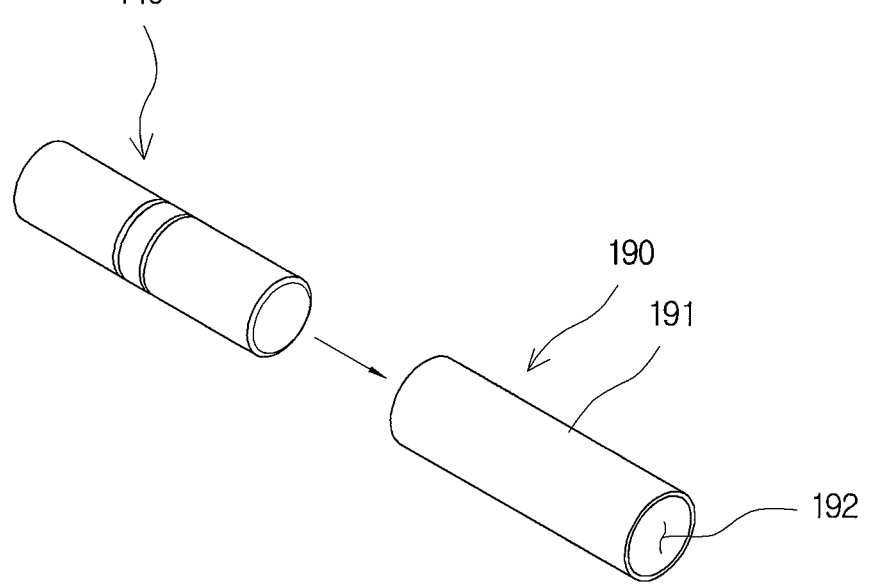
FIG. 3 is a perspective view of a magnet casing in accordance with an embodiment of the present invention.

FIG. 3 is a perspective view of a magnet casing in accordance with an embodiment of the present invention.

Referring to FIG. 3, a magnet casing 190 in accordance with an embodiment of the present invention includes a body 191 and a hollow part 192, which is formed in the body 191.

Although the body 191 can be manufactured in a variety of shapes, according to the shape of the magnet assembly 140, the body 191 of the magnet casing 190 in accordance with an embodiment of the present invention can be manufactured in a cylindrical shape having a hollow part formed therein, as illustrated in FIG. 3.

Considering the outer diameter of the magnet assembly 140, the inner diameter of the hollow part 192 is defined in such a way that the magnet assembly 140 is snug fit in the body 191. That is, the magnet assembly 140 is inserted into the hollow part 192 by way of interference fitting, which prevents the magnet assembly 140 from being detached from the body 191.

As an example, the magnet assembly 140 and the body 191 can be coupled to each other firmly by coating an adhesive on an outer surface of the magnet assembly 140 or an inner surface of the hollow part 192.

Therefore, the magnet assembly 140 can be supported firmly by the magnet casing 190 even though vibrations and shocks are applied to the magnet assembly 140. As a result, the core 142, the first magnet 143 and the second magnet 144 may not be separated from one another.

By mounting the magnet assembly 140, to which the magnet casing 190 is coupled, inside the linear type vibration motor 100 (shown in FIG. 2), the operating lifetime of the linear type vibration motor 100 can be extended, and this arrangement can also prevent the magnet assembly 140 from being damaged by an external shock.

If the density of magnetic flux is decreased around the magnet assembly 140, the electromagnetic force acting between the magnet assembly 140 and the coil 130 becomes weaker when an electric current is applied to the coil 130. Therefore, it is preferred that a material that can minimize weakening of the magnetic flux density formed around the magnet assembly 140 and may not change the direction of magnetic flux formed around the magnet assembly 140 is used for the magnet casing 190.

Figure 4:
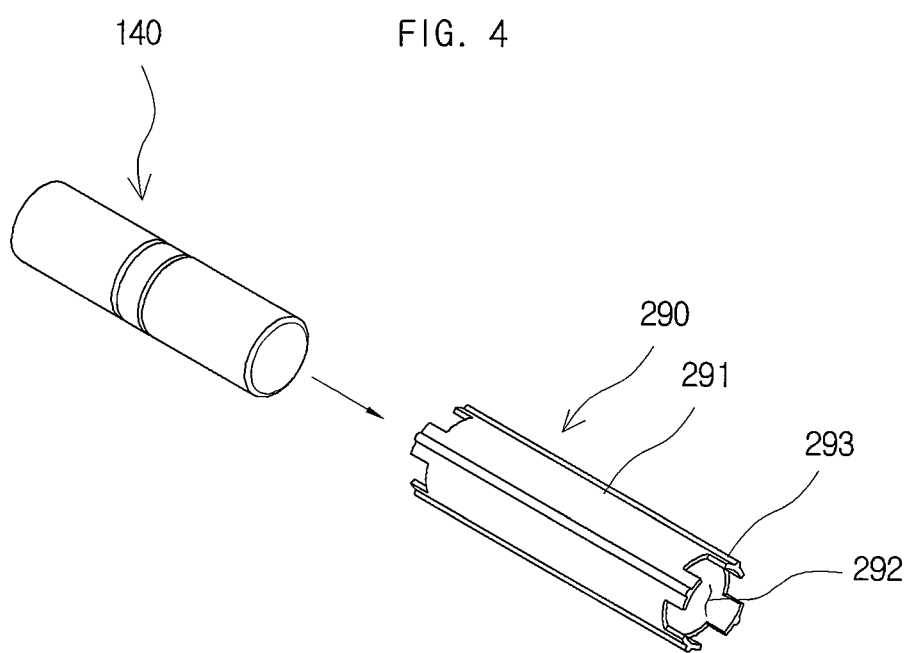
FIG. 4 is a perspective view of a magnet casing in accordance with another embodiment of the present invention.
Figure 5:
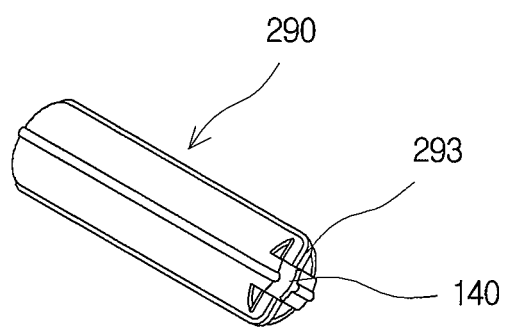
FIG. 5 is a perspective view illustrating an example of utilizing a magnet casing in accordance with another embodiment of the present invention.

FIG. 4 is a perspective view of a magnet casing in accordance with another embodiment of the present invention, and FIG. 5 is a perspective view illustrating an example of utilizing the magnet casing of FIG. 4. Referring to FIGS. 4 and 5, a magnet casing 290 in accordance with another embodiment of the present invention includes a body 291, a hollow part 292, which is formed in the body 291, and a plurality of fixing protrusions 293, which are formed on both ends of the body 291.

Although the body 291 can be manufactured in a variety of shapes, according to the shape of the magnet assembly 140, the body 291 of the magnet casing 290 in accordance with another embodiment of the present invention can be manufactured in a cylindrical shape having a hollow part formed therein, as illustrated in FIG. 4. Since the shape of the hollow part 292 is the same as that of the hollow part 192, which has been described with reference to FIG. 3, redundant descriptions are omitted herefrom.

Formed on both sides of the body 291 are the plurality of fixing protrusions 293, which function to fix the magnet assembly 140 by being bent toward the central longitudinal axis of the body 291 such that the magnet assembly 140 is prevented from being detached from the body 291.

Therefore, since the magnet assembly 140 is firmly supported by the magnet casing 290 in accordance with another embodiment of the present invention, the operating lifetime of the linear type vibration motor 100 can be extended, and this arrangement can also prevent the magnet assembly 140 from being damaged by an external shock. Also, in this embodiment, the adhesive that is used for the magnet casing 190 according to the previously described embodiment, which has been described with reference to FIG. 3, may not be used.

As an example, the fixing protrusions 293 can be manufactured in a single unit with the body 291, or can be manufactured separately and then coupled to the body 291. It is also preferred that an inelastic material is used for the fixing protrusions 293 because the fixing protrusions 293 should not be returned to their original shapes after they are bent. Moreover, by coating an adhesive on the inner surface of the fixing protrusions 293, the fixing protrusions 293 can be adhered to both ends of the magnet assembly 140 when the fixing protrusions 293 are bent.

Although it is not illustrated, the fixing protrusions 293 can be manufactured in a variety of shapes, and the number of the fixing protrusions 293 can vary, depending on the need. However, in order to prevent eccentricity caused by the casing 290 vibrating together with the magnet assembly 140, while the magnet assembly 140 is vibrated by the coil 130, the fixing protrusions 293 have to be formed symmetrically about the central longitudinal axis of the body 291.

Figure 6:
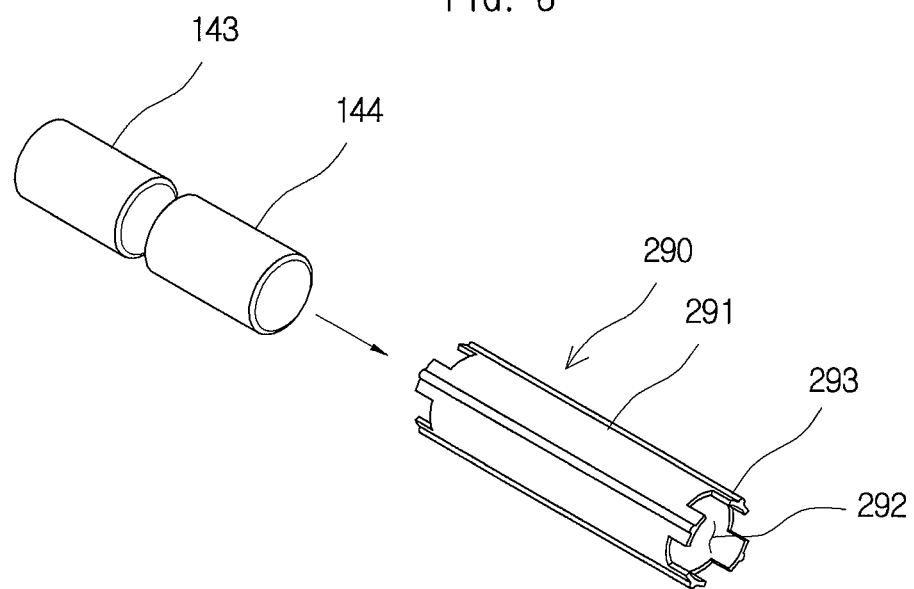
FIG. 6 is a perspective view illustrating another example of utilizing a magnet casing in accordance with another embodiment of the present invention.

FIG. 6 is a perspective view illustrating another example of utilizing a magnet casing in accordance with another embodiment of the present invention.

Referring to FIG. 6, the first magnet 143 and the second magnet 144 are coupled to the magnet casing 290. That is, even though the first magnet 143 and the second magnet 144 are not adhered to the core 142, unlike the magnet assembly 140 described by referring to FIG. 1, if the magnet casing 290 is used, the first magnet 143 and the second magnet 144 can be supported by the body 291, and thus the linear type vibration motor 100 can operate properly.

As such, since a process in which the first magnet 143 and the second magnet 144 are adhered to the core 142 is omitted by the magnet casing 290, the time and effort consumed to assemble the linear type vibration motor 100 can be saved.

However, as described above, in order to firmly fix the first magnet 143 and the second magnet 144 to the hollow part 292 of the body 291, the inner diameter of the hollow part 292 can be formed in such a way that the first magnet 143 and the second magnet 144 can be snug fit in the hollow part 292. In another example, the first magnet 143 and the second magnet 144 can be fixed to a certain part inside the body 291 by coating an adhesive on the outer surface of the first magnet 143 and the second magnet 144 or on the inner surface of the hollow part 292.

After the first magnet 143 and the second magnet 144 are inserted into the hollow part 292, the fixing protrusions 293 are bent so that the first magnet 143 and the second magnet 144 are prevented from being detached from the body 291.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A linear type vibration motor having a magnet casing, the linear type vibration motor comprising:
   a magnet assembly having a pair of magnets, same magnetic poles thereof facing each other;
   a magnet casing having a hollow part formed therein and housing the magnet assembly in the hollow part;
   a base having a bobbin formed thereon, the magnet casing being inserted into the bobbin;
   a coil being coupled to the bobbin;
   a weight coupled to both ends of the magnet casing; and
   a pair of elastic bodies interposed between either end of the base and either end of the weight, respectively,
   wherein at least one fixing protrusion is formed on both ends of the magnet casing, and the fixing protrusion is configured to fix the magnet assembly by being bent toward a central axis of the magnet casing such that the magnet assembly is prevented from being detached.

2. The linear type vibration motor of claim 1, wherein an adhesive is coated on an outer surface of the magnet assembly or an inner surface of the hollow part.

* * * * *